July 19, 1955 — C. A. HIRSCHBERG — 2,713,436
COVER FOR PRESERVE CONTAINERS
Filed Feb. 9, 1951
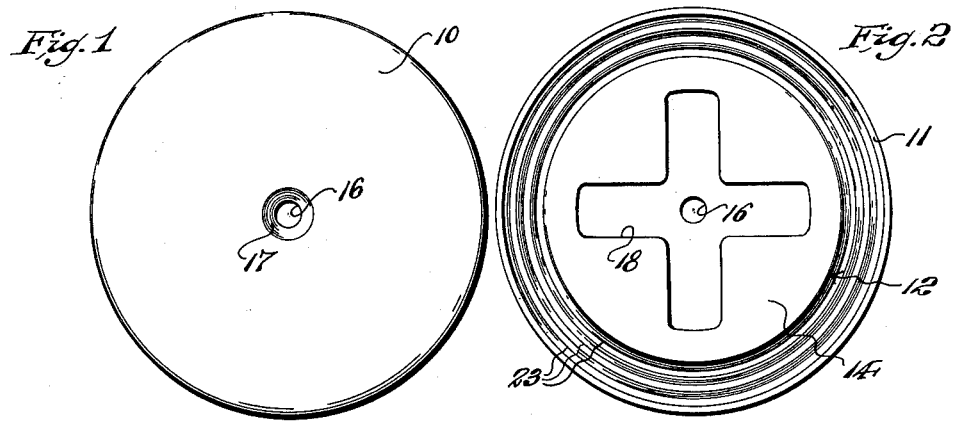
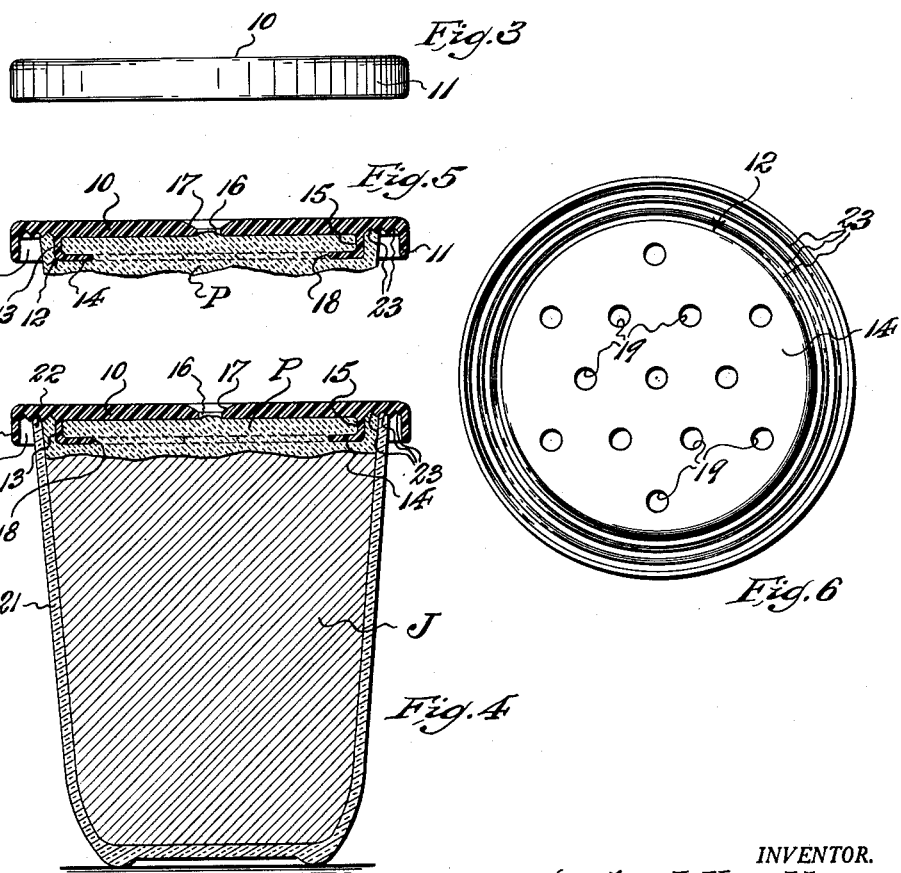
INVENTOR.
Charles A. Hirschberg,
BY George D. Richards
Attorney

2,713,436
COVER FOR PRESERVE CONTAINERS

Charles A. Hirschberg, Mountain Lakes, N. J.

Application February 9, 1951, Serial No. 210,150

2 Claims. (Cl. 215—38)

This invention relates to cover for containers used by housewives for the reception and storage of preserved food stuffs such as jellies, jams and the like, the content of which containers is usually sealed from the atmosphere by a top layer or body of paraffine or the like which is introduced into the containers so as to overlie the content thereof.

In "putting up" or preserving food stuffs, such as jellies, jams and the like, the housewife ordinarily makes use of various glasses or jars as containers. Such glasses or jars are either purchased for the purpose, or are glasses or jars which have previously been used as containers for other edibles, and, in the latter case, are not of uniform diametric size but vary more or less in such size. In most cases, after the sealing paraffine has been introduced into a container in covering and sealing relation to its content, an external cover, such as a flanged tin cover, is used as a final closure. If such cover is of loose fit, it is subject to risk of accidental displacement from the container. To avoid such risk, I have heretofore patented, by U. S. Letters Patent No. 2,263,558, a retainer for such tin covers which was adapted to be anchored in the paraffine sealing body, with its external portion engaged through and clinched over an opening or openings in the cover. Although this patented arrangement was reasonably satisfactory, it nevertheless involved a two piece assembly, and consequently it was a comparatively difficult and time consuming task to apply the cover and retainer in operative assembled relation to the container desired to be closed thereby. Furthermore, in use, risk was involved of rupturing or deforming the paraffine body when the cover was removed in attempt to withdraw the paraffine body therewith. Due to this, replacement of the cover and paraffine body, after partial removal of the container content, was frequently difficult of accomplishment, if not wholly prevented, and the integrity of the sealing body of paraffine was not assured.

Having the above in view, it is an object of the present invention to provide an improved cover for preserved food stuff containers which is of a one-piece non-metallic structure; which will concentrically fit itself to container tops or mouths of various diametric sizes; and which is so formed that molten paraffine can be poured therethrough into sealing contact with a container content and in interlocked assembly with the cover, after application of the latter to the container top or mouth, whereby the cover can be rotated to loosen the paraffine sealing body, so that it can be withdrawn from the container with the cover, without risk of rupturing or otherwise deforming said sealing body, and thereafter reinserted in the container with adequate resealing effect when the cover is replaced upon the container.

Other objects of this invention, not at this time more particularly enumerated, will be understood from the following detailed description of the same.

Illustrative embodiments of the invention are shown in the accompanying drawings, in which:

Fig. 1 is a top plan view of a container cover structure according to this invention; Fig. 2 is a bottom plan view of the same; and Fig. 3 is a side or edge elevational view thereof.

Fig. 4 is a vertical longitudinal sectional view of a container and its content as closed by the cover structure and sealed by a paraffine sealing body as operatively assembled with said cover structure; and Fig. 5 is a vertical longitudinal sectional view of the cover and sealing body assembly removed from the container.

Fig. 6 is a bottom plan view of a modified form of the cover structure.

Similar characters of reference are employed in the hereinabove described views, to indicate corresponding parts.

The cover for preserve glasses or jars, according to this invention, is produced form non-metallic material, preferably a plastic material, such e. g. as a synthetic resin plastic. The cover is in the form of a one-piece or unitary structure, and comprises a circular body plate 10 having an annular flange 11 dependent from its periphery. Integrally formed in connection with the under or inner face of the body plate 10 is a dependent, centrally disposed internal hollow boss 12 of reduced diameter comprising an annular side wall 13, and a bottom wall 14 which is downwardly offset from the body plate 10 in parallelly spaced relation thereto, thus providing an internal chamber 15 beneath said body plate. The body plate 10 is provided with a central opening or port 16 which communicates with the chamber 15 in said hollow boss 12. This opening or port 16 is preferably provided with a flared or funnel-like mouth portion 17 at its outer end. Formed in the bottom wall 14 of the hollow boss are one or more openings or perforations which also communicate with the chamber 15 in said hollow boss. For example, as shown in Figs. 2, 4, and 5, a single opening 18 of any suitable or desired peripheral shape may be provided; or, as shown in Fig. 6, a plurality of suitably spaced and grouped openings or perforations 19 may be utilized.

The internal hollow boss 12, which depends from the underside of the body plate 10, is of substantially smaller diameter than the internal diameter of the peripheral flange 11 of said body plate, thus providing an annular intermediate space 20 of substantial width for the reception of the mouth end portion of a glass or jar 21 to which the cover is desired to be applied. Due to the provision of this annular space 20, the cover may be engaged over the mouth end portions of glasses or jars of various diametric sizes within reasonable limits. When the cover is applied to a glass or jar 21, for reasons presently to be made clear, the internal hollow boss 12 of the cover should be disposed concentric to the wall of the glass or jar. Since diametric sizes of glasses or jars to which it is desired to apply the cover may vary, the cover is provided with means to so engage the lip 22 of a glass or jar mouth whereby to assure centering of the cover upon the glass or jar, and thus to assure the desired concentric disposition of the internal hollow boss 12 relative to the glass or jar wall. To this end, the underside of that portion of the body plate 10, which extends intermediate the periphery of the internal hollow boss 12 and the dependent flange 11, is provided with a series of concentric annular grooves 23, which are preferably of inverted V-shape in cross-section. It will be obvious that, when the cover is applied to the mouth end of a glass or jar 21, the lip 22 of the glass or jar mouth will find, enter and engage a groove 23 which best corresponds to the diametric size of the glass or jar mouth, so that by such engagement the cover will rest upon the glass or jar in concentric relation to the axis of the latter, and so as to assure that the internal hollow boss 12 of the cover will be disposed concentric to the wall of the glass or jar (see Fig. 4).

In the use of the cover of this invention, after the housewife has filled a desired quantity of the jelly, jam or like preserve J into a selected glass or jar 21, the cover is then applied over the mouth of the latter, and centered thereon by engagement of the lip 22 of said mouth in a groove 23 of the cover of corresponding diametric size. After the cover is thus assembled in covering relation to the open top of the glass or jar, molten paraffine is poured through the opening or port 16 of said cover. The molten paraffine will flow into the chamber 15 of the internal hollow boss 12 of the cover, and thence through the openings 18 or 19 in the bottom wall 14 of the latter into the space between the cover and the top surface of the content J of the glass or jar. Such introduction of the molten paraffine is continued until the introduced mass thereof appears within the opening or port 16. When this occurs, the molten paraffine has filled all space between the cover and the content J of the glass or jar, and has also filled the chamber 15 of the internal hollow boss 12 of the cover. When the thus introduced paraffine cools and hardens, it will form a sealing plug P, which not only seals off the content J of the glass or jar from contact by the atmosphere, but which will be strongly interlocked with the cover so as to become unitary therewith (see Fig. 4). The paraffine plug P not only seals the content J of the glass or jar against contact by the atmosphere, but also serves to efficiently anchor the cover to the glass or jar so that the former is securely held against accidental displacement from the latter.

Since the hardened paraffine plug P and cover are interlocked together in unitary relation, the same provide a cover assembly which can not only be readily removed from the glass or jar to give access to the content J thereof, but, with equal facility and adequate sealing effect, be reassembled with the glass or jar to close the same in protection of any remaining content thereof not removed and desired to be reserved for future consumption. Since, as above pointed out, the internal boss 12 is held in concentric relation to the wall of the glass or jar, it will be obvious that manual turning or twisting of the cover to loosen the plug P from adherence to the wall of the glass or jar can be safely effected without risk of rupturing or deforming the paraffine plug P, when it is desired to withdraw the cover and plug to give access to the content J, of the glass or jar. When the cover is removed, the assembly of the paraffine plug P therewith is not disturbed (see Fig. 5), and consequently reapplication of the cover and plug assembly to recover the glass or jar is in no way impeded, nor is the sealing efficiency of the replaced assembly in any way diminished.

It will be obvious that the cover may be repeatedly used. To condition the cover for reuse, the same is merely immersed in water sufficiently hot to melt the paraffine plug P, so that the paraffine may drain away from the cover and thus be removed therefrom.

It will be understood that the invention is not to be limited to the specific construction or arrangement of parts above described or shown in the accompanying drawings, but that they may be widely modified within the scope of the invention as defined by the here following claims.

I claim:

1. A one-piece cover of rigid plastic material for application upon the open top end of a container, the content of which is desired to be sealed against contact with the atmosphere by a self-hardening initially fusible sealing substance such as paraffine, said cover comprising a flat body plate of substantially larger diameter than the diameter of the open top of said container, and having an external annular flange dependent from its periphery to overhang the rim of the latter, an internal hollow boss of smaller diameter than the internal diameter of the open top of said container to depend from the under face of said body plate for entrance into said container, said boss comprising an annular side wall and a flat perforate bottom wall spaced below said body plate to provide an intermediate chamber, said body plate having a filling opening leading into said chamber through which the sealing substance can be supplied to fill said chamber, and by flow from the latter through the perforate bottom wall of said boss, to also fill the space between the container content and the cover, said supplied sealing substance upon hardening serving to form a sealing plug which is concealed by and interlocked to the cover in unitary relation thereto, and so as to withdraw from the container with the cover when the latter is removed from the former.

2. A cover for a container as defined by claim 1, wherein the underside of its body plate is provided, intermediate its external flange and its internal boss, with concentric grooves selectively engageable by the container top rim to center the applied cover upon the container.

References Cited in the file of this patent

UNITED STATES PATENTS

| 893,469 | Essmuller | July 14, 1908 |
| 1,032,836 | Jess | July 16, 1912 |
| 1,336,367 | Martineau | Apr. 6, 1920 |
| 1,404,113 | Gonnella | Jan. 17, 1922 |
| 1,459,277 | Bloom | June 19, 1923 |
| 1,834,085 | Bloom | Dec. 1, 1931 |
| 2,263,558 | Hirschberg | Nov. 25, 1941 |
| 2,619,088 | Saffir | Nov. 25, 1952 |

FOREIGN PATENTS

| 171,977 | Great Britain | Apr. 6, 1922 |
| 670,372 | Germany | Apr. 3, 1935 |
| 104,862 | Australia | Aug. 17, 1938 |
| 605,906 | Great Britain | Aug. 3, 1948 |